United States Patent
Schongar et al.

(10) Patent No.: US 7,885,204 B1
(45) Date of Patent: Feb. 8, 2011

(54) METHOD AND SYSTEM FOR TESTING NETWORK TOPOLOGY

(75) Inventors: William Schongar, Mason, NH (US); Raja Sekhara K. Reddy, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 541 days.

(21) Appl. No.: 11/503,478

(22) Filed: Aug. 11, 2006

(51) Int. Cl.
*H04L 12/28* (2006.01)
(52) U.S. Cl. .................................... 370/254
(58) Field of Classification Search ................ 709/220, 709/223; 370/252, 254; 714/43; 703/13
See application file for complete search history.

(56) References Cited

U.S. PATENT DOCUMENTS

| | | | | |
|---|---|---|---|---|
| 6,014,697 | A * | 1/2000 | Lewis et al. ................. | 709/223 |
| 7,120,680 | B1 * | 10/2006 | Higgins et al. .............. | 709/220 |
| 7,278,061 | B2 * | 10/2007 | Smith .......................... | 714/43 |
| 7,620,535 | B2 * | 11/2009 | Shevenell et al. ............. | 703/13 |
| 2002/0032762 | A1 * | 3/2002 | Price et al. .................... | 709/223 |
| 2005/0125520 | A1 * | 6/2005 | Hanson et al. ................ | 709/223 |
| 2005/0169193 | A1 * | 8/2005 | Black et al. .................. | 370/254 |
| 2005/0286439 | A1 * | 12/2005 | Capelle et al. ............... | 370/252 |

OTHER PUBLICATIONS

Zeng Bin; A Model of Scalable Distributed Network Performance Management; Parallel Architectures, Algorithms and Networks, 2004. Proceedings. 7th International Symposium on; May 10-12, 2004; 607-612; IEEE.

* cited by examiner

*Primary Examiner*—Derrick W Ferris
*Assistant Examiner*—Gbemileke Onamuti
(74) *Attorney, Agent, or Firm*—Fish & Richardson P.C.

(57) ABSTRACT

Methods and systems have been provided for testing network topologies. A network management system converts multiple types of static and dynamic network hardware data sources into a single unified format and provides a uniform mechanism for data access. The network management system identifies attributes of the topology of a network that are required for testing. The network management system further compares the identified attributes, optional and required, with the attributes of a test network. Based on the comparison, a test-bed is created in the test network for testing the resources.

17 Claims, 6 Drawing Sheets

METHOD AND SYSTEM FOR TESTING NETWORK TOPOLOGY

BACKGROUND OF THE INVENTION

1. Copyright Notice

In the description herein for embodiments of the present invention, a portion of the disclosure recited in the specification contains material, which is subject to copyright protection. Computer program source code, object code, instructions, text, or other functional information that is executable by a machine may be included in tables, figures or in other forms. The copyright owner has no objection to the facsimile reproduction of the specification as filed in the Patent and Trademark Office. Otherwise, all copyright rights are reserved.

2. Field of the Invention

Embodiments of the invention relate, in general, to representing and accessing topological information of a network. More specifically, embodiments of the invention relate to a method and a system for a generalized representation of the topology for testing network resources.

3. Description of the Background Art

A network is a collection of interconnected network elements. The network elements include devices, interfaces, and communication links. The devices, such as routers, switches, and computers, are used to interact with other network elements. The interfaces enable a device to interact with the other devices in the network. Examples of interfaces include a Local Area Network (LAN) port in a router, a Wide Area Network (WAN) port in a router or a Network Interface Card (NIC) in a computer. The communication links facilitate the interactions between the various network elements.

The physical and logical relationship of the network elements is referred to as 'network topology'. The physical relationship refers to the physical arrangement of the network elements within the network, such as a star topology, a mesh topology or a bus topology. The logical relationship refers to the method used by the network elements to communicate across the corresponding physical topology. The logical topology describes the network protocol used by the network elements. Ethernet protocol and LocalTalk protocol are examples of logical bus topology protocols. The network topology facilitates monitoring the performance of the network. For example, the logical topology can be used to figure out the maximum possible transfer rate of data between two routers in the network. The network topology is also used to figure out problems like bottleneck in transmission of data, or below par performance of a network element. Such problems have an effect on the performance characteristics of the network.

The performance characteristics of the network are identified by testing the network elements and interfaces (collectively, resources) available in the network. Resource testing can be automated with the use of scripts. Resource tests are often conducted by service-providers or vendors of a network element in their network to maintain performance and identify potential or actual operational problems. The network of the service-provider is herein after referred to as a test network. The service-provider, or a vendor of a network element deployed in the network, often replicate the topology of the network to understand the operational demands on the resource in the network. The replicated environment includes the devices, interfaces, and the communication links required for testing the resource. The replicated environment is referred to as a 'test-bed', which is created within the test network.

The method of creation of the test-bed involves two steps. The first step is identifying the operational environment of the resource in the network. The second step is identification of the network elements necessary for creation of the test-bed.

The first step requires obtaining the network topology information of the network. Often times, the network topology is described in a specific format that is not readily portable between the owner of the network and the service provider or the vendor. The topology format employed for each network often depends on its functional capabilities and requirements of the network, which often results in the topology information that describes the network not being compatible with the test-bed. To set up the test bed, service providers and venders must often manually draw the network topology and import it to their test bed. This creates difficulty in information reuse, results in redundant efforts to automate the process for creating the test-bed, and creates a large number of process inefficiencies. Further, a hand drawn topology is a time consuming task and error-prone.

In the past, there have been efforts to provide a way to describe network topology in a unified manner. For example, one approach has been to use a unified network topology where representations of a number of networks are combined to depict one network comprising multiple sub-networks. This helps in sharing of topology information within the combined networks. However, since the test-bed is different from the network, it is common that the unified network topology is still not compatible with the test-bed.

The second step involves comparison of the identified operational environment with the resources of the test network. The identified operational environment is used to customize the scripts that are used for resource testing. Some of the network elements from the test network are selected based on the comparison. Conventionally, this is performed manually by script integrators. Script integrators are individuals who prepare the test-bed based on the operational environment of the resource. The script integrators manually identify the network elements of the test network that will best match the operating environment of the resource. Understandably, this method is also both time consuming and error-prone.

DETAILED DESCRIPTION OF EMBODIMENTS OF THE INVENTION

Embodiments of the invention provide methods, systems, and computer-readable media for testing a resource available in a network. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail, to avoid obscuring aspects of embodiments of the present invention.

Embodiments of the present invention relate to developing a topology-related data file in a commonly used format, such as an Extended Markup Language (XML) format. Embodiments of the present invention also include a set of tools and Application Program Interfaces (APIs) for creating, accessing, modifying and making decisions based on the information contained in the topology-related data file. The invention is deployed in a network. The XML format provides an easily accessible format that can be accessed by any American Standard Code for Information Interchange (ASCII) editor like Microsoft© Notepad or Microsoft© WordPad. Further, the information contained in the topology-related data file can also be viewed graphically through commercial tools or through APIs provided as a part of the invention. Such methods for graphical representation of network topology are discussed in detail later.

The tools and APIs provided by the invention facilitate the analysis of the network performance by a service-provider. Specifically, a user initially identifies the essential requirements for the network's operational environment. The service-provider may then use the tools and APIs provided in accordance with the present invention to select network elements from the service provider network based on the operational environment identified by the user. The selected network elements are used to create a test-bed replicating the network.

Figure 1:
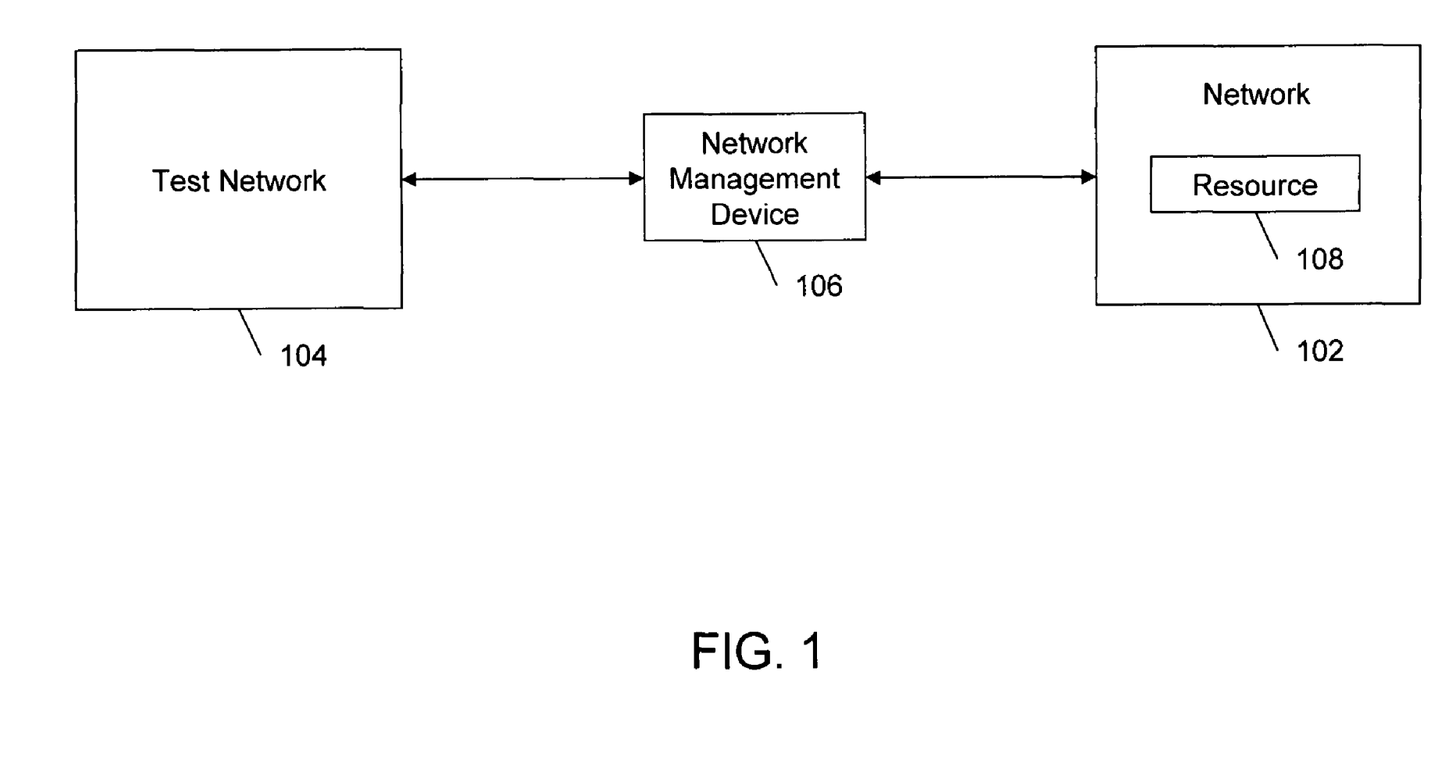
FIG. 1 illustrates an environment where embodiments of the invention are performed.

Referring now to the drawings, more particularly by their reference numbers, FIG. 1 illustrates an environment, wherein embodiments of the invention are performed. Network 102 is a collection of interconnected network elements. Network 102 facilitates the transfer of data between the network elements that comprise network resources such as devices, interfaces, and communication links, among others. Examples of devices include routers, switches, computers, and so forth. The devices are connected within network 102 and to the Internet via interfaces. An interface is computer hardware, associated circuitry, and computer program that link one device with another. Interfaces are used for conversion of data format between a format readable by the device and a format that can be transmitted across network 102. The format that is used for transmission of data is based on the protocol followed in network 102. Examples of protocols used within network 102 are Ethernet protocol, LocalTalk protocol, and Token Ring protocol and others that are known in the art. Interfaces are also used for conversion of data format between a format readable by the device and a format that can be transmitted outside network 102, for example across the Internet. The format that is used for transmission of data in the Internet is based on the Internet Protocol (IP). Examples of interfaces are an Ethernet Local Area Network (LAN) port in a router and a Wide Area Network (WAN) port in a router. The Ethernet LAN port converts data formats within network 102 based on the Ethernet protocol. The WAN port converts the format of data from the format being used in network 102 to a format based on IP.

Interfaces are connected to each other via communication links. These communication links are hereinafter referred to as 'connections'. The physical and logical relationship of the devices, interfaces, and connections within network 102 is referred to as the 'network topology' of network 102.

The physical relationship refers to the physical arrangement of the devices, interfaces and connections within the network, such as a star topology, a mesh topology or a bus topology. In case of a star topology there is a central device like a router, a switch or a hub computer that transmits the data within network 102 and also facilitates transmission of data between network 102 and the Internet.

The logical topology describes the network protocol used for transmission of data. Ethernet protocol and LocalTalk protocol are examples of commonly used logical bus topology protocols. The network topology is expressed in a topology-related data file that is shared across network 102 and across other networks if required. The topology-related data file includes the network elements available in network 102 and the physical and logical relationship between the network elements. The topology-related data file also includes information about various properties of the network elements that are available within network 102. For example, for a router available in network 102 the topology-related data file includes information about the type of the router, the network address of the router, the hardware details of the router, and the interfaces available in the router.

The network topology facilitates in indicating the performance of the network. For example, the network topology is used to figure out the maximum possible transfer rate of data between two routers in the network. The network topology is also used to resolve problems like bottleneck in transmission of data, or below par performance of a network element. Such problems have an effect on the performance characteristics of the network. The network topology is used to understand problems, if any, that are associated with network 102. Such problems are like slow transfer rate or loss of data during the transmission. Methods of solving such problems involve identifying a network element that is the cause of the problem. Thereafter, the identified network element is tested.

Resource 108 is a network element that requires testing. Testing of resource 108 depends on the topology of network 102, since the operational performance of resource 108 varies, depending on the topology. Therefore, it is essential for the testing of resource 108 to be carried out in an environment that is similar to the topology of network 102.

The topology-related information of network 102 is accessed by a Network Management Device (NMD) 106. In an embodiment of the invention NMD 106 is included in the Network Management System (NMS) in network 102. NMD 106 facilitates the creation of a test-bed, based on the topology of network 102. The test-bed is a platform that replicates the operational environment of resource 108. The test-bed contains the devices, interfaces, communication links and software tools required to test resource 108. NMD 106 gathers the topology-related information of network 102. The test-bed for testing resource 108 is created by NMD 106, based on the topology information of network 102. Testing of resource 108 is conducted on a network, such as a test network 104 that is different from network 102. Use of a separate network reduces computational load of testing on network 102.

Test network 104 is a network that facilitates testing of different networks. Further, test network 104 provides a means for testing of resource 108, without involving network 102. Test network 104 comprises various network elements that are used interchangeably to provide test-beds for testing different resources.

In one embodiment of the invention, network 102 is a consumer network and test network 104 is a service-provider network. A router in the consumer network exemplifies resource 108. NMD 106 accesses the topological data of the consumer network. NMD 106 identifies the essential requirements of the test-bed for the testing of the router. NMD 106 then facilitates the creation of a test-bed in the service-provider network. Various elements of NMD 106 have been discussed in detail subsequently.

Figure 2:
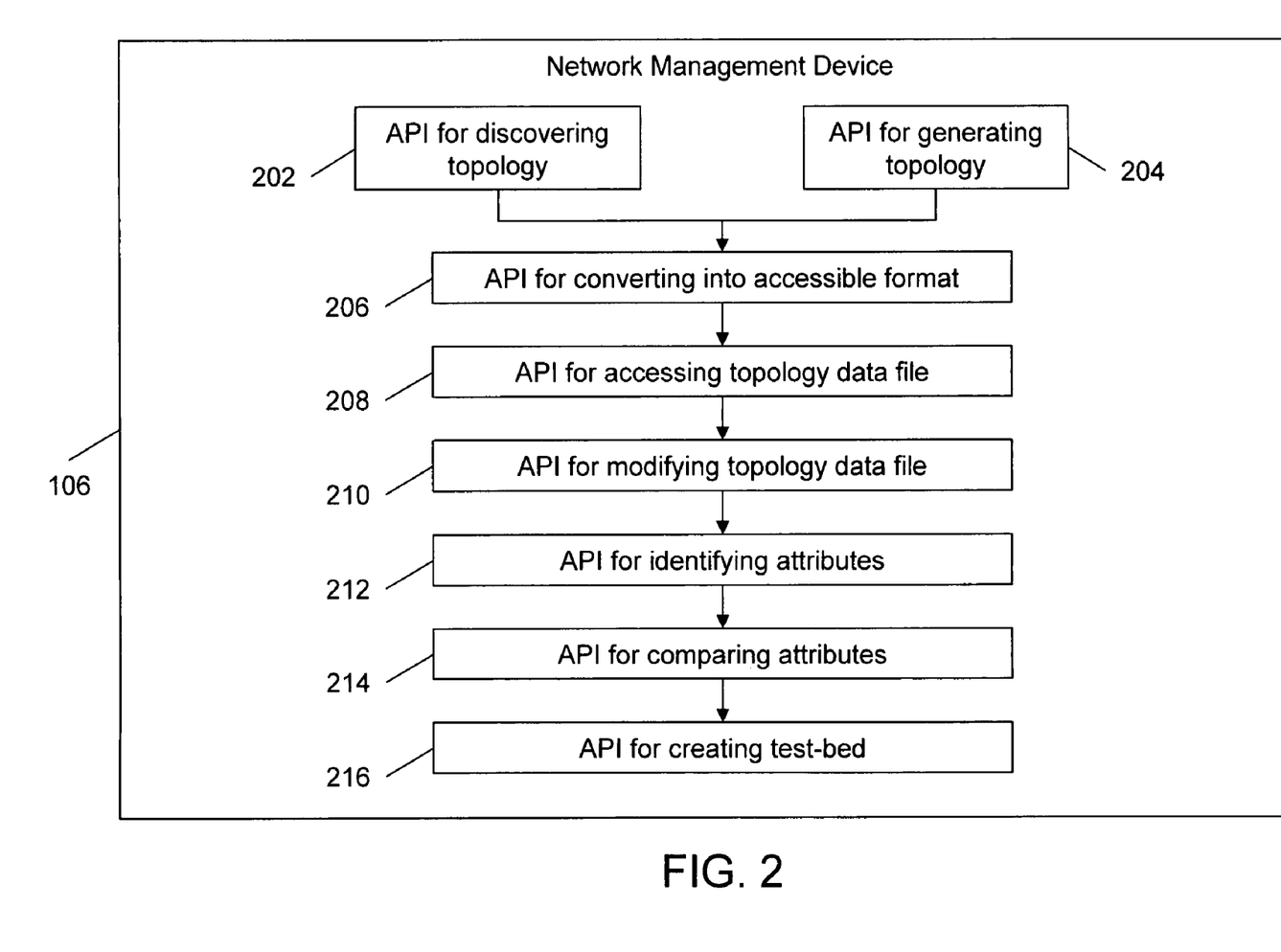
FIG. 2 illustrates various system elements in a network management device in accordance with an embodiment of the invention.

FIG. 2 illustrates various system elements in NMD 106, in accordance with an embodiment of the invention. NMD 106 creates the test-bed in test network 104 to test resource 108. For the creation of the test-bed, NMD 106 requires information about the topology of network 106. The information is included in the topology-related data file. The topology-related data file may already be available in network 102. If the topology-related data file is available in network 102, Application Program Interface (API) 202 discovers the topology-related data file. The topology-related data file is in a format that is used in network 102. For the topology-related data file to be accessible by test network 104, the file is converted to the XML based easily accessible format by API 206. API 206 reads the topology-related data file discovered by API 202 and converts the format of the topology-related data file into an XML format.

However, if the topology-related data file is not available in network 102, then API 204 generates the topology-related data file. The topology-related data file is generated by either interoperating with the Cisco Discovery Protocol (CDP), or by parsing device configuration data and making element associations based on existing rules. The CDP method connects to devices capable of CDP-based communications and configures them for CDP communications. Once CDP is active on the devices the output of CDP messages is parsed into the XML format, and relational data as well as local hardware data is used to build the topology. The configuration parser method reads either static or live configuration data from devices and extracts relationships from the device-specific format to build network topology information NMD 106 further comprises API 208 to access the topology-related data file. API 208 includes API for listing various devices, interfaces and communication links available in network 102. In one embodiment of the invention, a user in test network 104 accesses the topology-related data file using API 208 or a visual editor tool. A visual editor tool, like Eclipse, facilitates in viewing the graphical representation of the topology of network 102. Once the topology-related data file is accessed, there may be a need to modify it.

API 210 is used to modify the topology-related data file. In an embodiment of the invention, API 210 is used to add information about some network elements that are not included in the topology-related data file. In another embodiment of the invention, API 210 is used to add information about attributes of the network elements that are included in the topology-related data file. For example, the topology-related data file is modified when the user adds information about an interface available in a server to the topology-related data file. The modified topology-related data file is then used to identify attributes of the test-bed for testing resource 108. The attributes are discussed in conjunction with FIG. 6.

API 212 is used for the identification of attributes of network 102. API 212 identifies attributes required for testing resource 108. NMD 106 further comprises API 214 for comparing the identified attributes with the attributes of the network elements in test network 104. API 214 finds network elements in test network 104 that best match the identified attributes. API 216 is then used to create the test-bed for testing resource 108 using the identified network elements. The method to create the test-bed, in accordance with an embodiment of the invention is further described in conjunction with FIG. 3.

Figure 3:
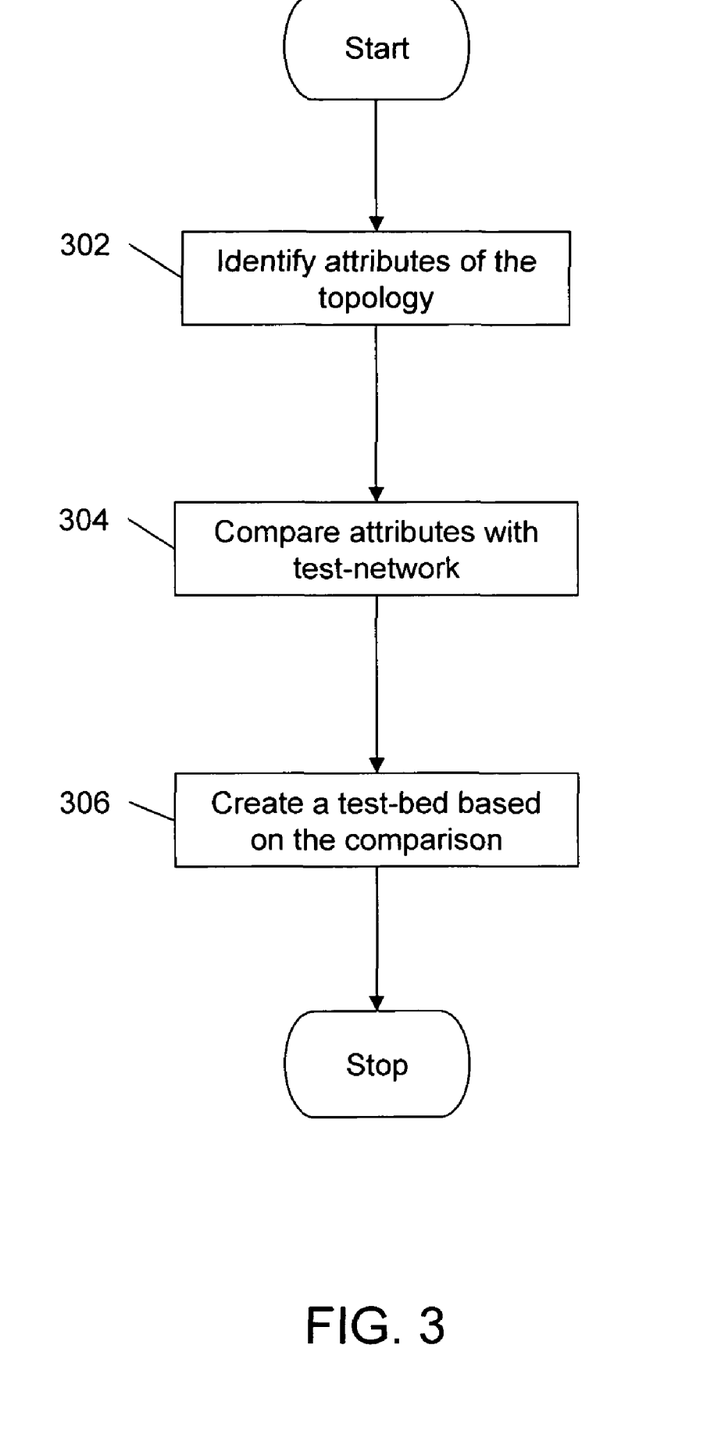
FIG. 3 is a flowchart illustrating a method for testing a resource available in a network in accordance with an embodiment of the invention.

FIG. 3 is a flowchart illustrating a method for testing resource 108, in accordance with an embodiment of the invention. Resource 108 is tested in test network 104. At 302, the attributes of the topology of network 102, required for testing resource 108, are identified. In an embodiment of the invention, API 212 is a mechanism by which a script for testing resource 108 defines the attributes of the network elements required in the test-bed. API 212 reads a topology-related data file and forms a list of the attributes. The topology-related data file may be in Tool Command Language (TCL) format, XML format among others. An example of the TCL file is as follows:

```
devices {
    <router alias> {
        <attribute of router> <value>
        ...
        interfaces {
            <interface alias>{
                <attribute of interface> <value>
                peer <remote interface alias>
                ...
            }
        }
    }
    <router name> {
        ...
    }
}
```

Computer program source code, object code, instructions, text or other functional information that is executable by a machine may be included in an appendix, tables, figures or in other forms. The copyright owner has no objection to the facsimile reproduction of the specification as filed in the Patent and Trademark Office. In the above-mentioned file, a router has been defined as a device required for testing resource 108. The value of attribute of router specifies the type and properties of the router. More attributes can be specified, if required. Further, attribute of interface defines the attributes of the interface that the router must possess. peer <remote interface alias> specifies the devices that must be connected to the router in the test-bed. In the above file, the device and the interface aliases are arbitrary and have no relation to the real name or alias of the devices and interfaces in the topology of test network 104. In essence, they are variable names of real devices and interfaces that match the attributes listed in the file.

In another example, API 212 reads a file in XML format listing the attributes of the devices and interfaces required for creating a test-bed. A minimal example of an XML file follows:

```
<topology>
    <device id="r1 ">
        <type>c7200</type>
        <interface id="r1_int1">
            <type>ethernet</type>
            <peer>r2_int1</peer>
```

-continued

```
        </interface>
    </device>
</topology>
```

Computer program source code, object code, instructions, text or other functional information that is executable by a machine may be included in an appendix, tables, figures or in other forms. The copyright owner has no objection to the facsimile reproduction of the specification as filed in the Patent and Trademark Office. In the above file, the attributes of the devices and interfaces required for testing resource 108 are defined. Further, device id and interface id are aliases that are used to refer to the real devices and interfaces that match the attributes listed in the file. Additional attributes and graphical representation are explained in detail in conjunction with FIG. 6.

At 304, the identified attributes are compared with the attributes of the network elements in test network 104. In an embodiment of the invention, API 214 compares the identified attributes to the attributes of the network elements in test network 104. For identifying the attributes of the network elements in test network 104, API 214 accesses the topology-related data file of test network 104. API 214 matches the identified attributes with the attributes of the devices and interfaces in test network 104. In one embodiment of the invention, API 214 internally stores the identities of the network elements available in test network 104 that best match the identified attributes.

At 306, the test-bed for testing resource 108 is created. API 216 creates the test-bed in test network 104 based on the comparison at 304. API 216 modifies the topology-related data file to include the details of the test-bed formed.

Figure 4:
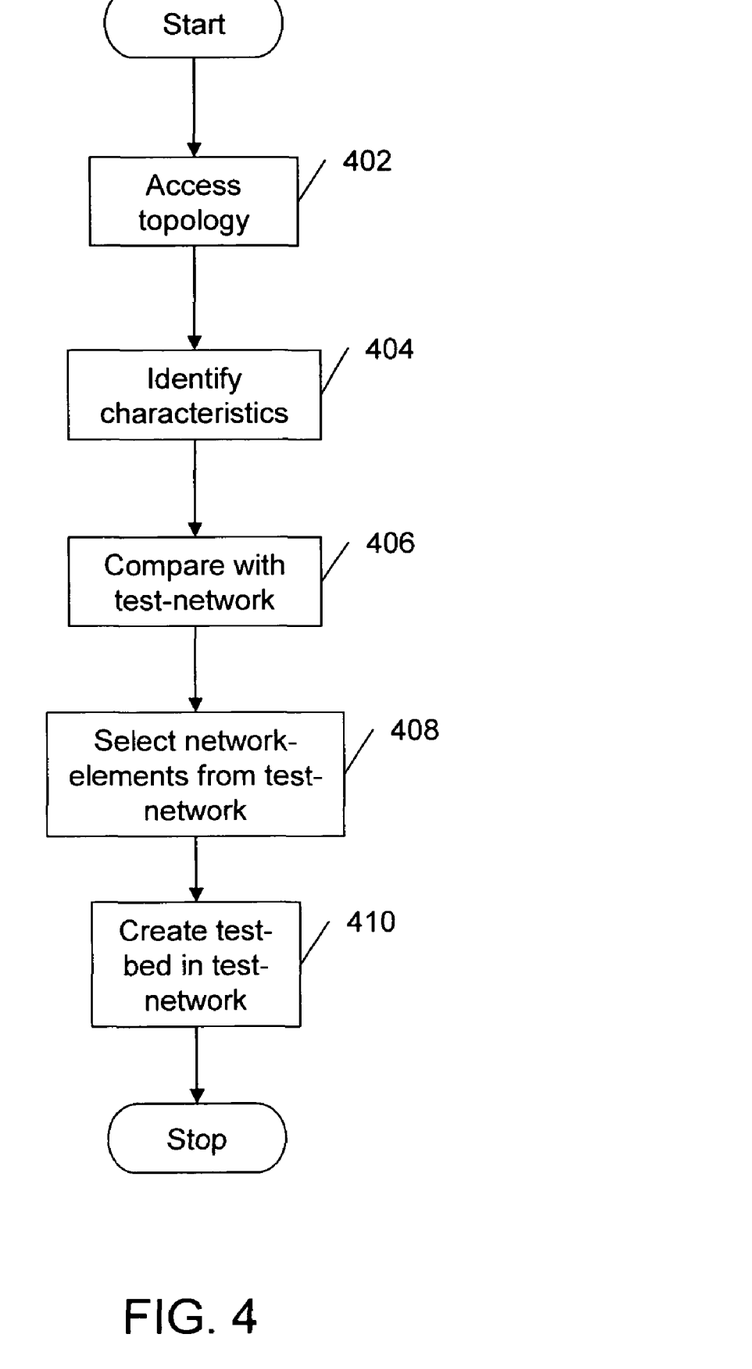
FIG. 4 is a flowchart illustrating a method for testing a resource available in the network in accordance with an embodiment of the invention.

FIG. 4 is a flowchart illustrating a method for testing a resource available in network 102, in accordance with another embodiment of the invention. At 402, the topology-related information of network 102 is accessed from test network 104. The topology-related data file of network 102 is accessed from test network 104 by using API 208 that is used to list the network elements available in network 102. For example, API 208 is used to list the devices, the interfaces or the connections available in network 102. Further, API 208 is used to list the properties of the network elements available in network 102. The topology-related data file accessed at 402 is used to identify the attributes of the test-bed that are required for testing resource 108.

At 404, the attributes required for testing resource 108 are identified. The user accessing the topology-related data file identifies the attributes of the test-bed required for testing resource 108, at 402. Further, the user creates a file that includes information regarding the identified attributes. For example, the user creates a TCL or an XML format file. At 404, API 212 reads the file generated by the user and stores the attributes of the test-bed required for testing resource 108. The stored attributes facilitate the creation of the test-bed.

At 406, the identified attributes are compared to the attributes of test network 104. API 214 compares and accesses the topology-related information of test network 104, to identify the attributes of test network 104.

At 408, the network elements available in test network 104 are selected based on the comparison carried out at 406. The network elements that best match the identified attributes are selected. For example, API 214 compares the attributes identified at 404 and selects the network elements from test network 104, based on the comparison.

At 410, the selected network elements are used to form the test-bed for testing resource 108. The user creates the test-bed using API 216.

The above-mentioned method involves the creation of the test-bed by identifying the attributes required for testing resource 108 from the topology-related data file of network 102. The invention also provides methods for locating or creating the topology-related data file in a format accessible by test network 104.

Figure 5:
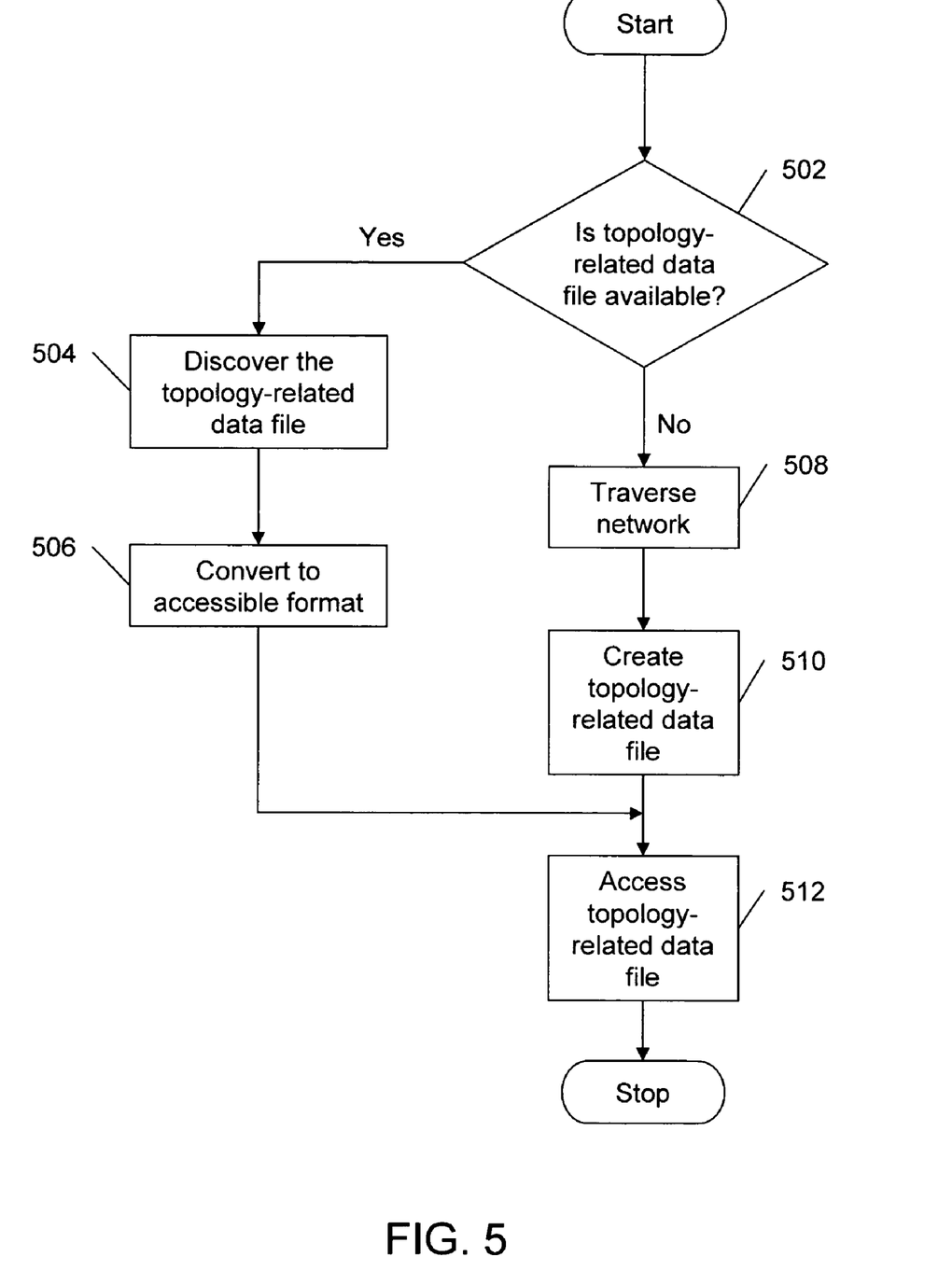
FIG. 5 is a flowchart illustrating a method for identifying attributes of a topology in accordance with an embodiment of the invention.

FIG. 5 is a flowchart illustrating a method for identifying attributes of the test-bed for testing resource 108, in accordance with an embodiment of the invention. At 502, it is determined whether the topology-related data file is available in network 102. In case it is available, then, the topology-related data file is discovered at 504. Further, the topology-related data file is in a format that is accessible only by network 102. At 506, the topology-related data file is converted into a format accessible by test network 104. For example, the topology-related data file is converted to an XML format. As mentioned earlier, the conversion is performed by API 206.

If the topology-related data file is not available in network 102, then, at 508, network 102 is traversed to determine the topology-related information of network 102. In an embodiment, the traversing is carried out manually. At 510, a topology-related data file is created, based on the topology data obtained by traversing network 102. As described in conjunction with FIG. 3, the topology-related data file is created by using ASCII text editors such as Microsoft© Notepad or Microsoft© WordPad. In one embodiment of the invention, for a topology with two routers Router A and Router B with one interface each (ethernet I/O), an XML format file is created.

```
<topology>
    <device>
        <name>Router A</name>
        <type>c7200</type>
        <interface>
            <name>ethernet1/0</name>
            <type>ethernet</type>
        </interface>
    </device>
    <device>
        <name>Router B</name>
        <type>c7200</type>
        <interface>
            <name>ethernet1/0</name>
            <type>ethernet</type>
            <connection>
                <type>physical</type>
                <peer>RouterA::ethernet1/0</peer>
            </connection>
        </interface>
    </device>
</topology>
```

Computer program source code, object code, instructions, text or other functional information that is executable by a machine may be included in an appendix, tables, figures or in other forms. The copyright owner has no objection to the facsimile reproduction of the specification as filed in the Patent and Trademark Office.

API 210 is used to create the topology-related data file. Further, API 210 allows addition of information about the devices, the interfaces or the connections in network 102 to the topology-related data file. API 210 also allows addition of attributes of the network elements in network 102 to the topology-related data file. Examples of the attributes of the network elements are: operating system of a computer available in network 102, hardware details of an interface available in network 102, and peer information of a connection available in network 102.

In one embodiment of the invention, a TCL-based script performs 508 and 510. The script is used for traversing the network and automatically determining the topology-related information. The script is connected to network 102. It identifies the devices, interfaces and connections in network 102, and looks for connections between interfaces. The script then creates the topology-related data file, which can further be modified by using API 210.

At 512, the topology-related data file is accessed from test network 104. As mentioned in relation to 404, the topology-related data file is accessed by API 208. The accessed topology-related data file is used to identify the attributes of the test-bed required for testing resource 108. The topology can also be accessed by viewing a pictorial visualization using a visual editor tool.

Figure 6:
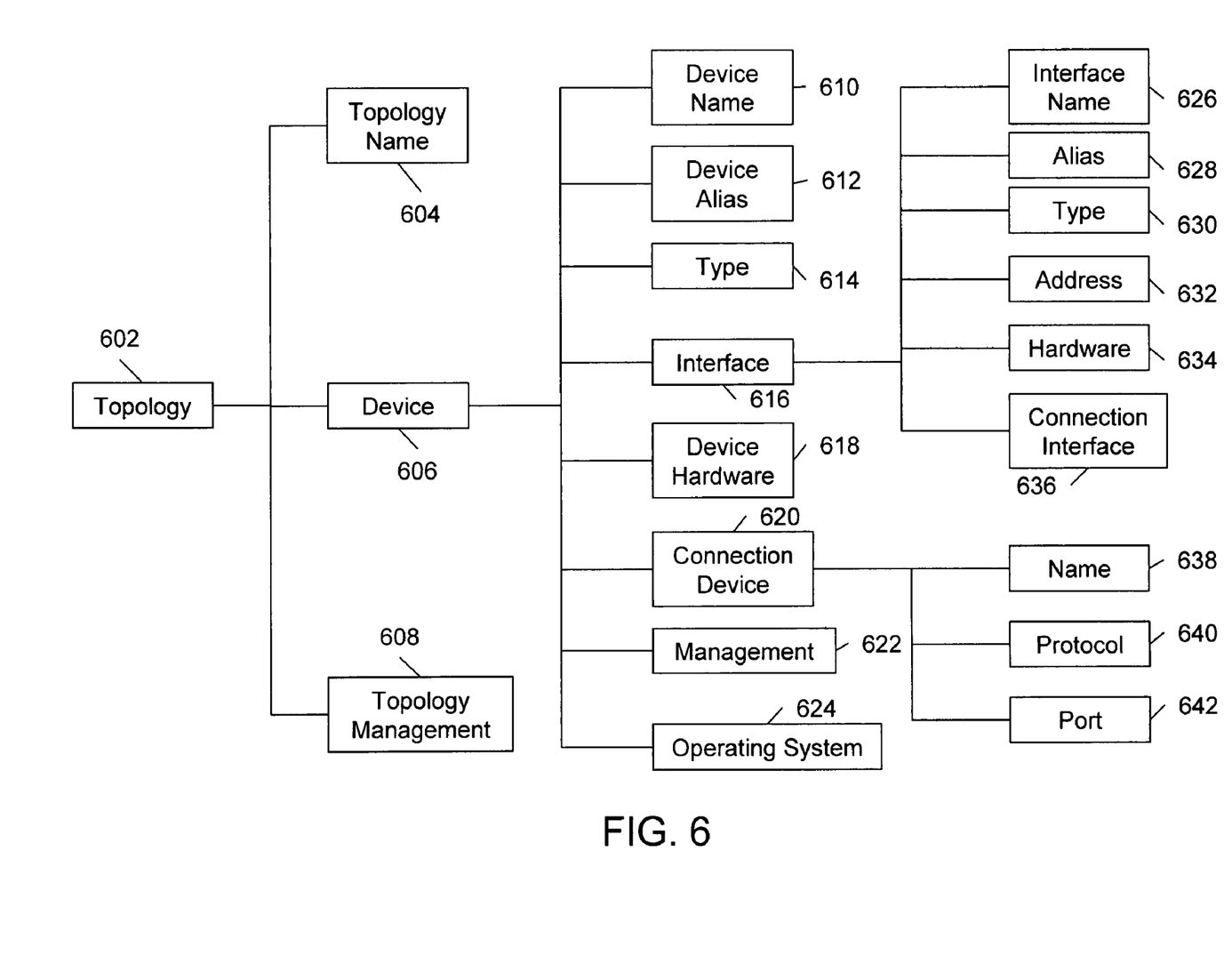
FIG. 6 illustrates an exemplary visualization of the topology of a network in accordance with an embodiment of the invention.

FIG. 6 illustrates an exemplary visualization of the topology of network 102, in accordance with an embodiment of the invention. The graphical tree structure is viewed using a visual editor tool such as Eclipse. Topology 602 represents the accompanying topology structure for network 102. Topology name 604 is the reference name for topology 602. Device 606 is a physical device in topology 602. However, the number of devices in topology 602 is not limited to one only. In another embodiment of the invention, topology 602 has more than one device. In this case, all the devices are listed in the tree structure.

Topology management 608 refers to the management information about topology 602. Attributes of device 606 and Topology management 608 are further defined within the topology-related data file. Some of the attributes of device 606 that can be further defined are described below.

Device name 610 refers to the host name of device 606. The host name is the reference for the device in network 102. A device alias 612 refers to the alias used to refer to device 606. Type 614 refers to the product family type of device 606. Interface 616 refers to information about an interface available in device 606. Further, device 606 may have more than one interface. In such an example, all the interfaces are listed in the tree diagram. Device hardware 618 refers to the information defining the hardware characteristics of device 606. Connection device 620 refers to the information regarding connections between device 606 and other devices. A management 622 refers to the management information for device 606. Operating system 624 defines the operating system running on device 606. Further, some more attributes can be defined for device 606 such as the region where device 606 is placed. Moreover, the attributes of device 606 are further defined by more attributes. For example, interface 616 and connection device 620 have other attributes also that define them.

Interface name 626 gives the full name of interface 616. An alias 628 is the reference alias for interface 616. A type 630 is the type of interface 616 such as Ethernet. An address 632 is the network address assigned to interface 616. Hardware 634 describes the hardware details of interface 616. A connection interface 636 gives the connection information of interface 616.

Name 638 gives the name of connection device 620. A protocol 640 gives the connection method of connection device 620, such as telnet. A port 642 gives the port information required for connection device 620.

Embodiments of the invention facilitate in testing resource 108. The testing is carried out on the test-bed created in test network 104. The test-bed is created using some of the network elements of test network 104.

Embodiments of the invention facilitate the sharing of topology information between network 102 and test network 104. The topology information of network 102 helps in assessing the performance of network 102 from test network 104.

Embodiments of the invention facilitate the sharing of a test script and a test tool between network 102 and test network 104. The invention provides methods for generating the topology-related data file of network 102 and test network 104 in an XML format. The XML format file is accessible by any ASCII editor. Therefore, the test script and the test tool written in test network 104 are used in network 102 as the format of the input for the test script and the test tool in a common format.

Embodiments of the invention facilitate the search for a particular network element in test network 104, based on certain requirements. For example, a router of a particular type with a particular type of interface in test network 104 has to be searched for and. The invention provides methods for searching for the router in test network 104 that matches the defined requirements.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer-readable medium' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Also in the description herein for embodiments of the present invention, a portion of the disclosure recited in the specification may contain material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

What is claimed is:

1. A method for testing a resource available in a network, wherein the testing is performed in a test network, the method comprising:

obtaining in a network management device (NMD), a topology-related data file having information about a topology of the network, wherein the information about the topology of the network comprises relationships between network elements in the network, and availability of network elements in the network;

converting the topology-related data file from a base format into a format compatible with the test network if the topology-related data file is obtained by being discovered in the network;

traversing the network to generate the topology-related data file in the format compatible with the test network, the generated topology-related data file being modifiable using an application program interface (API) on the NMD to add information about an interface available in a server, wherein the traversing is performed if the topology-related data file is not discovered in the network;

identifying attributes of the network topology for testing the resource by accessing at least one of the generated topology-related data file and the converted topology-related data file from the network, wherein the identified attributes comprise connection information regarding connections between the resource to be tested and other network elements in the network;

comparing the identified attributes from the network with attributes of the topology of the test network to determine a best match of network elements in the test network; and creating a test-bed for testing the resource using the test network, the test-bed being created based on the attribute comparison and the best match, wherein the test-bed comprises a platform in the test network that replicates an operational environment of the resource, and wherein the test network is separate from the network having the resource.

2. The method of claim 1, wherein the converting the topology-related data file from the base format into the format compatible with the test network comprises using the API on the NMD.

3. The method of claim 2, wherein the converting the discovered topology-related data file further comprises converting the discovered topology-related data file into Extensible Markup Language (XML).

4. The method of claim 1, wherein the comparing the identified attributes further comprises:
   accessing topology data of the test network; and
   comparing the identified attributes of the network with the attributes of the accessed topology data of the test network.

5. The method of claim 1, wherein the creating the test-bed comprises:
   selecting resources available in the test network based on the attribute comparison; and
   creating the test-bed in the test network using the selected resources.

6. The method of claim 1, wherein:
   the network comprises a consumer network; and
   the test network comprises a service-provider network.

7. The method of claim 1, wherein the traversing the network to generate the topology-related data file comprises using Cisco Discovery Protocol (CDP).

8. The method of claim 1, wherein the base format comprises a Tool Command Language (TCL) format.

9. The method of claim 1, wherein the comparing the identified attributes comprises using a device identification alias.

10. The method of claim 1, wherein the comparing the identified attributes comprises using an interface identification alias.

11. The method of claim 1, further comprising viewing a graphical tree structure of the network topology on a display screen.

12. A system for testing a resource available in a network, wherein the testing is performed in a test network, the system comprising:
   means for obtaining in a network management device (NMD), a topology-related data file having information about a topology of the network, wherein the information about the topology of the network comprises relationships between network elements in the network, and availability of network elements in the network;
   means for converting the topology-related data file from a base format into a format compatible with the test network if the topology-related data file is obtained by being discovered in the network;
   means for traversing the network to generate the topology-related data file in the format compatible with the test network, the generated topology-related data file being modifiable using an application program interface (API) on the NMD to add information about an interface available in a server, wherein the traversing is performed if the topology-related data file is not discovered in the network;
   means for identifying attributes of the network topology for testing the resource by accessing at least one of the generated topology-related data file and the converted topology-related data file from the network, wherein the identified attributes comprise connection information regarding connections between the resource to be tested and other network elements in the network;
   means for comparing the identified attributes from the network with attributes of the topology of the test network to determine a best match of network elements in the test network; and
   means for creating a test-bed for testing the resource using the test network, the test-bed being created based on the attribute comparison and the best match, wherein the test-bed comprises a platform in the test network that replicates an operational environment of the resource, and wherein the test network is separate from the network having the resource.

13. An apparatus for testing a resource available in a network, wherein the testing is performed in a test network, the apparatus comprising:
   a processing system including a processor coupled to a display and a user input device; and
   a non-transitory computer-readable storage medium including instructions executable by the processor, the storage medium comprising:
   one or more instructions for obtaining in a network management device (NMD), a topology-related data file having information about a topology of the network, wherein the information about the topology of the network comprises relationships between network elements in the network, and availability of network elements in the network;
   one or more instructions for converting the topology-related data file from a base format into a format compatible with the test network if the topology-related data file is obtained by being discovered in the network;
   one or more instructions for traversing the network to generate the topology-related data file in the format compatible with the test network, the generated topology-related data file being modifiable using an application program interface (API) on the NMD to add information about an interface available in a server, wherein the traversing is performed if the topology-related data file is not discovered in the network;
   one or more instructions for identifying attributes of the topology of the network for testing the resource by accessing at least one of the generated topology-related data file and the converted topology-related data file from the network, wherein the identified attributes comprise connection information regarding connections between the resource to be tested and other network elements in the network;
   one or more instructions for comparing the identified attributes from the network with attributes of the topology of the test network to determine a best match of network elements in the test net; and one or more instructions for creating a test-bed based for testing the resource using the test network, the test-bed being created on the attribute comparison and the best match, wherein the test-bed comprises a platform in the test network that replicates an operational environment of the resource, and wherein the test network is separate from the network having the resource.

14. The apparatus of claim 13, wherein the processing system further comprises:
   an API for the discovering of the topology-related data file in the network;
   an API for the converting of the discovered topology-related data file into the format compatible with the test network; and
   an API for the accessing of the at least one of the generated and the converted topology-related data files from the test network.

15. The apparatus of claim 14, wherein the APIs for the converting of the discovered topology-related data file comprises APIs for converting the generated topology-related data file into Extensible Markup Language (XML).

16. The apparatus of claim 14, wherein the processing system further comprises:
   an API for the generating of the topology-related data file of the network; and
   an API for the accessing of the generated topology-related data file from the test network.

17. A non-transitory computer-readable storage medium for testing a resource available in a network, wherein the testing is done in a test network, the storage medium including instructions executable by a processor, the storage medium comprising:
   one or more instructions for obtaining in a network management device (NMD), a topology-related data file having information about a topology of the network, wherein the information about the topology of the network comprises relationships between network elements in the network, and availability of network elements in the network;
   one or more instructions for converting the topology-related data file from a base format into a format compatible with the test network if the topology-related data file is obtained by being discovered in the network;
   one or more instructions for traversing the network to generate the topology-related data file in the format compatible with the test network, the generated topology-related data file being modifiable using an application program interface (API) on the NMD to add information about an interface available in a server, wherein the traversing is performed if the topology-related data file is not discovered in the network;
   one or more instructions for identifying attributes of the topology of the network for testing the resource by accessing at least one of the generated topology-related data file and the converted topology-related data file from the network, wherein the identified attributes comprise connection information regarding connections between the resource to be tested and other network elements in the network;
   one or more instructions for comparing the identified attributes from the network with attributes of the topology of the test network to determine a best match of network elements in the test network; and
   one or more instructions for creating a test-bed for testing the resource using the test network, the test-bed being created based on the attribute comparison and the best match, wherein the test-bed comprises a platform in the test network that replicates an operational environment of the resource, and wherein the test network is separate from the network having the resource.

* * * * *